United States Patent

Burke

Patent Number: 5,062,652
Date of Patent: Nov. 5, 1991

[54] SULKY

[76] Inventor: Mervin G. Burke, R.R. #3, Chelmsford, Ontario P0M 1L0, Canada

[21] Appl. No.: 320,055

[22] Filed: Mar. 7, 1989

[30] Foreign Application Priority Data

Oct. 12, 1988 [CA] Canada .................................. 580121

[51] Int. Cl.$^5$ .............................................. B62C 1/08
[52] U.S. Cl. ...................................... 280/64; 280/65; 280/75
[58] Field of Search ........................ 280/63, 64, 65, 66, 280/67, 68, 69, 70, 71, 72, 73, 74, 75, 76, 77, 47.131

[56] References Cited

U.S. PATENT DOCUMENTS

| | | | |
|---|---|---|---|
| 433,386 | 7/1890 | Zeigler | 280/65 |
| 502,028 | 7/1893 | Bradley | 280/66 |
| 562,702 | 6/1896 | Brockman | 280/64 |
| 629,237 | 7/1899 | Cheney | 280/64 |
| 804,386 | 11/1905 | Dain | 280/65 |
| 811,723 | 2/1906 | Jerald | 280/63 |
| 815,615 | 3/1906 | Miller | 280/65 |
| 862,836 | 8/1907 | Miller | 280/65 |
| 1,052,497 | 2/1913 | McCormick | 280/63 |
| 1,223,494 | 4/1917 | Judge | 280/74 |
| 3,912,292 | 10/1975 | Lichfield | 280/63 |
| 4,095,815 | 6/1978 | Mitchell | 280/63 |
| 4,135,730 | 1/1979 | Yunick | 280/65 |

FOREIGN PATENT DOCUMENTS 463323 4/1951 Italy ....................................... 280/66

*Primary Examiner*—Charles A. Marmor
*Assistant Examiner*—Brian L. Johnson
*Attorney, Agent, or Firm*—Wegner, Cantor, Mueller & Player

[57] ABSTRACT

A sulky adapted to be pulled by a horse includes a rigid frame having rear and forward cross members and a pair of transversely spaced thills connected to and extending forwardly from the cross members. An elongate tubular frame member is used to mount a driver's seat on this rigid frame. A pair of transversely spaced, downwardly extending wheel mounts are pivotally connected at their upper ends to the rigid frame. A ground engaging wheel is rotatively connected to the lower end of each wheel mount. A torsion bar suspension mechanism is connected to both of the wheel mounts and the rigid frame for yieldably supporting the frame on the wheels. A shock absorber mechanism connects the tubular frame member to the rear cross member while the front of the tubular frame member is pivotally connected to the forward cross member.

13 Claims, 3 Drawing Sheets

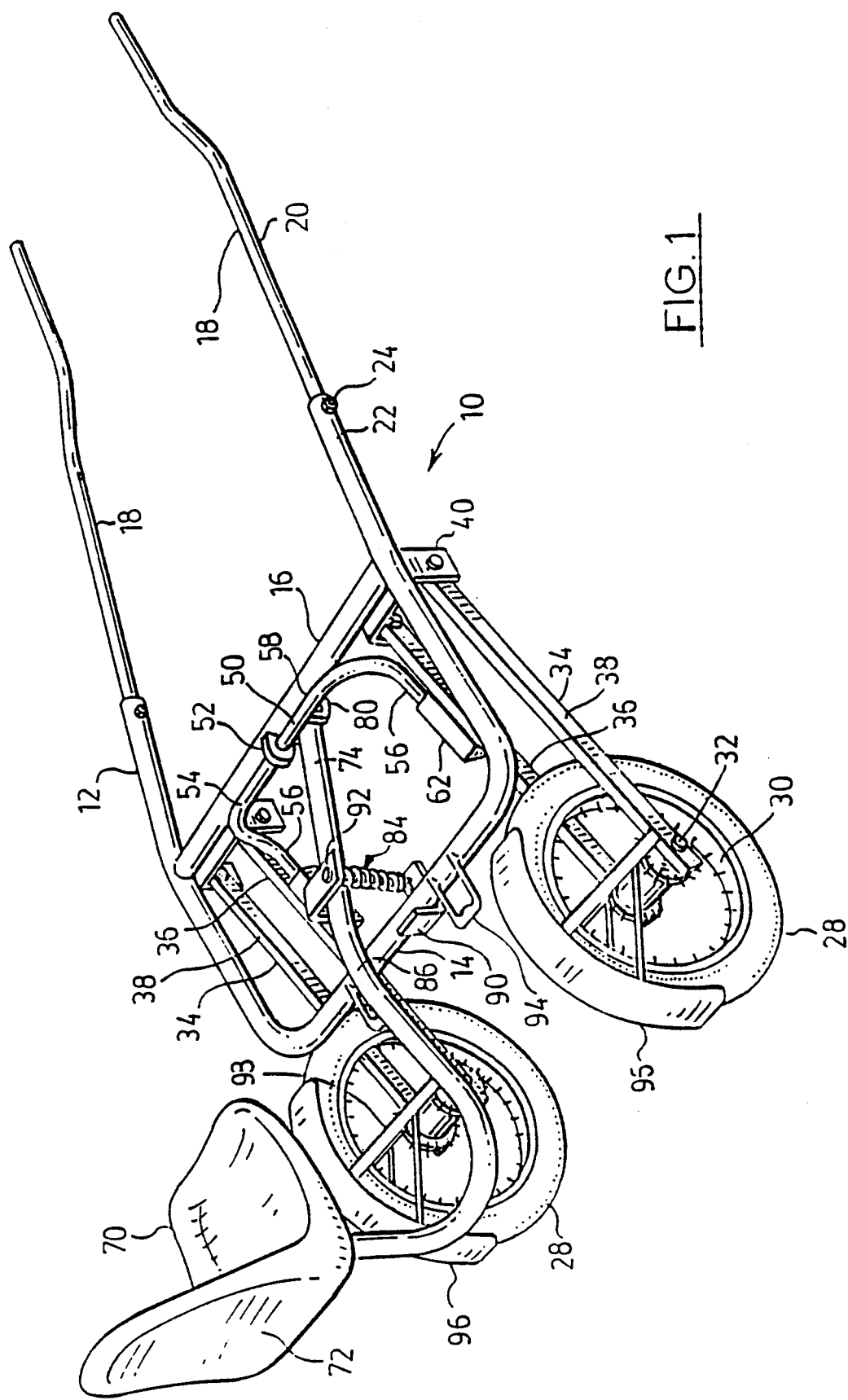

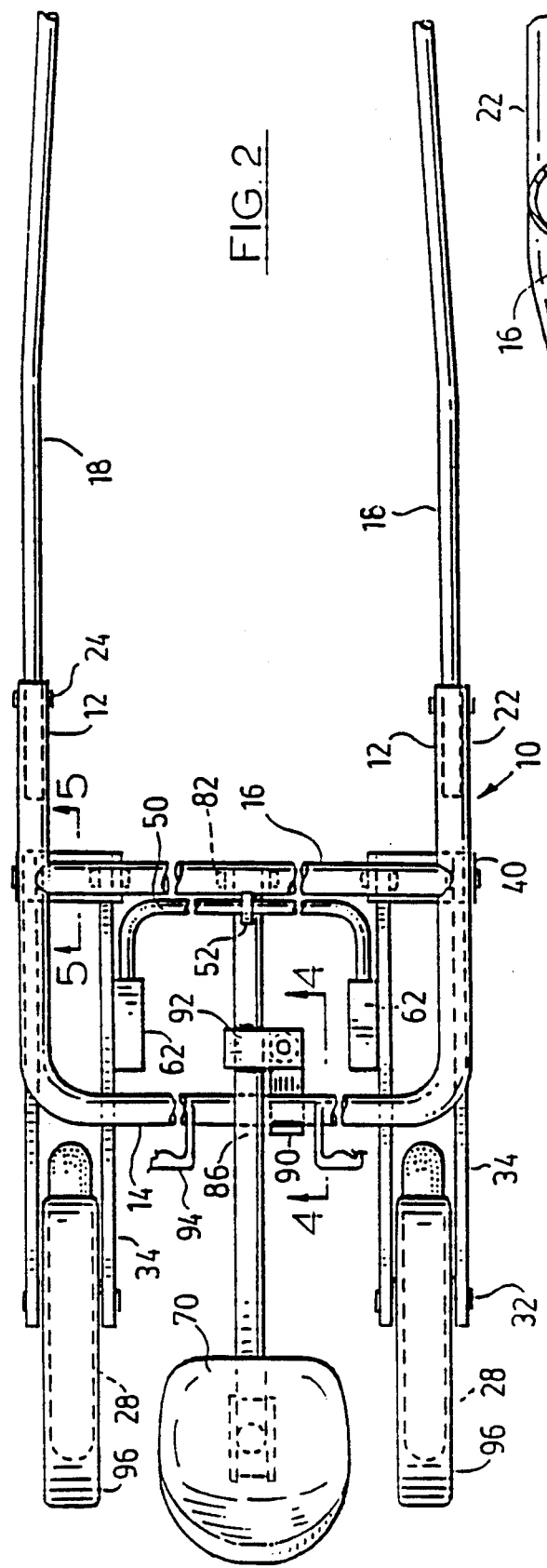
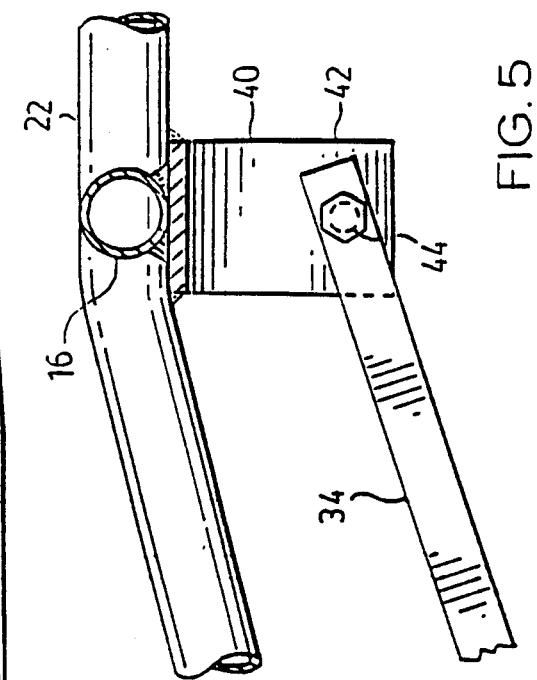
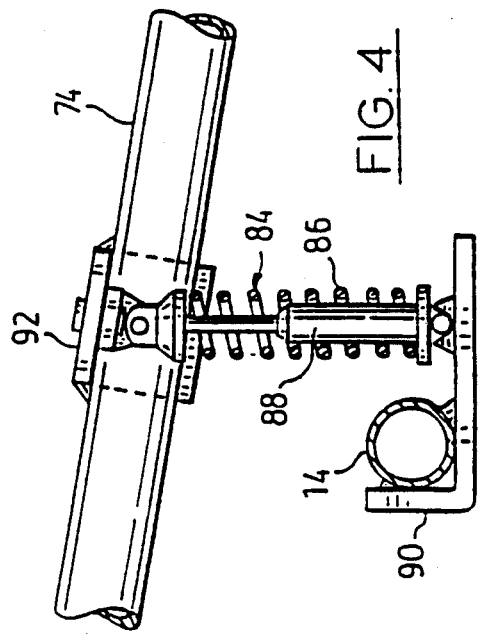

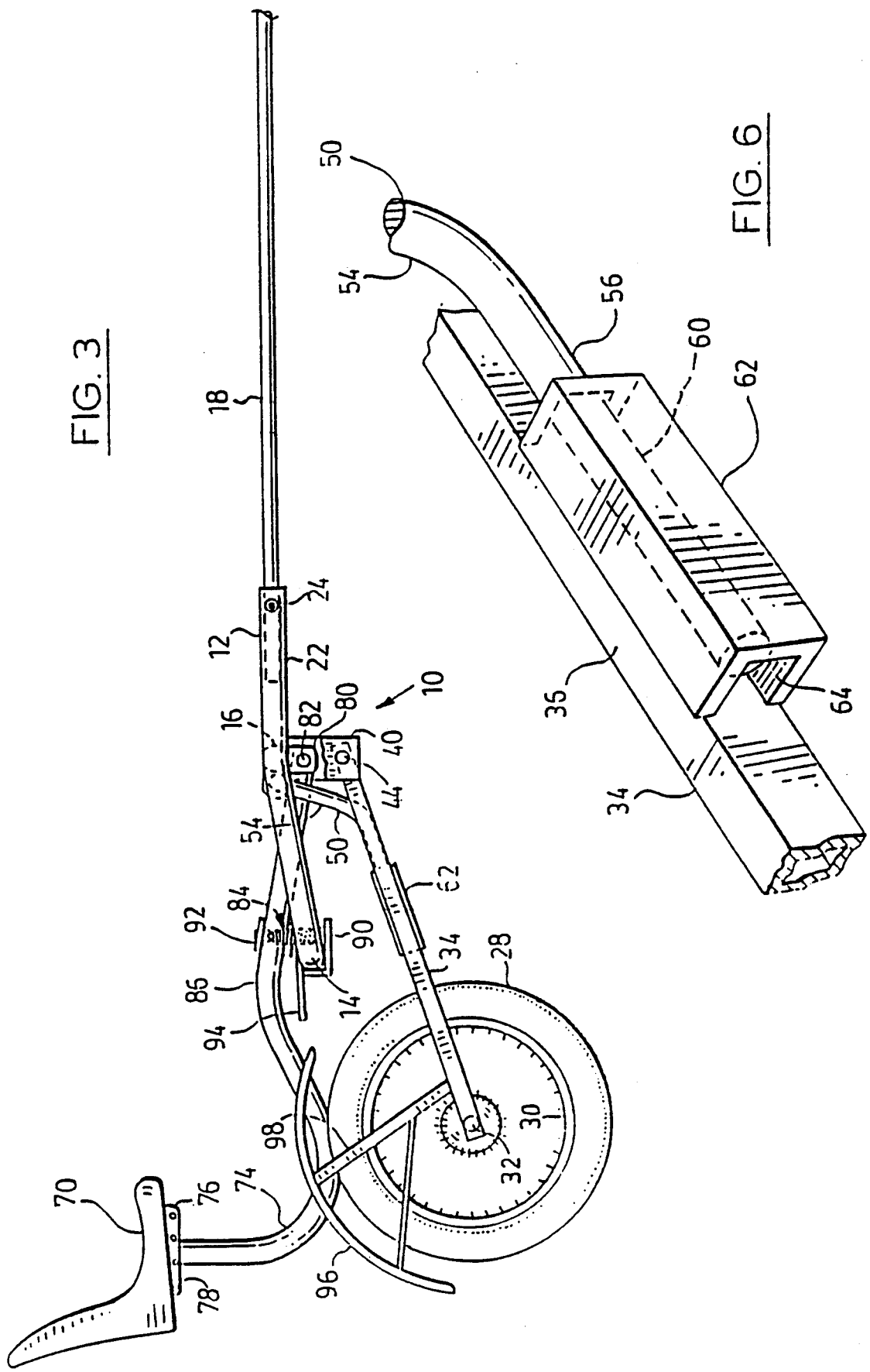

SULKY

BACKGROUND OF THE INVENTION

This invention relates to sulkies and particularly those adapted for pulling by a horse for racing purposes.

Light, racing type sulkies have been known and used for quite some time. These two wheel vehicles generally have a pair of transversely spaced thills which are connected together at the rear by one or more cross members. A single seat is provided for the driver and this can be mounted on one or more of the cross members.

There are a number of known problems with the commonly used sulkies. A major problem arises from the fact that most sulkies do not have any suspension or shock absorbing mechanism for the two wheels which are generally mounted on shafts rigidly connected by metal brackets to tho main frame. Thus the only built-in shock absorbing mechanism in these known sulkies is the air in the rubber tires and possibly small springs under the single seat.

Further difficulties with the known sulkies arise from the location of the scat which is positioned generally in the same horizontal plane as the main frame of the sulky. This known seat arrangement requires the driver to sit in an unnatural, back stressing position with his legs up higher than the seat and his shoulders hunched forward. Because of this, back strain is common amongst sulky drivers. The position of the seat in the known sulkies can also make it difficult for the driver to see ahead of the horse since the seat is quite low and positioned immediately behind the horse.

U.S. Pat. No. 4,135,730 issued Jan. 23, 1979 to S. A. Yunick describes a racing type sulky that does have springs and shock absorbers arranged between the mainframe and the wheels. In one described version of a sulky, each of the two wheels is mounted on a fork member that extends downwardly at an incline from an end portion of a cross member of the mainframe. A shock absorber and spring assembly has its lower end connected at a point adjacent the wheel axle while its upper end is pivotally connected to the aforementioned cross member. The single seat is mounted immediately to the rear of the cross member and is connected thereto.

It is an object of the present invention to provide a sulky that is comfortable to ride and easy to use. It is a further object of the invention to provide a sulky that is relatively easy to construct and maintain and can be made at a reasonable cost.

SUMMARY OF THE INVENTION

According to one aspect of the invention a sulky adapted for pulling by an animal, such as a horse, includes a rigid frame having a rear cross member and a pair of transversely spaced thills connected to and extending forwardly from the cross member. There is a driver's seat and means for mounting this seat on the frame. A pair of transversely spaced, downwardly extending wheel mounts are pivotally connected at their upper ends to the frame. A ground engaging wheel is rotatably connected to the lower end of each of these wheel mounts. A torsion bar suspension mechanism is connected to both of the wheel mounts and the frame for yieldably supporting the frame on the two wheels.

According to another aspect of the invention, a sulky includes a rigid frame having a pair of transversely spaced thills and cross frame means extending between and connecting the thills together at their rear. There is also an elongate frame member extending in the longitudinal direction of the thills, disposed between rear end portions of the thills and having a driver's seat mounted on its rear end. The front end of this frame member is pivotally connected to the cross frame means. A shock absorber mechanism connects the frame member to the cross frame means. Two ground engaging wheels are rotatably connected by a suitable mechanism to a rear section of the rigid frame.

According to a further aspect of the invention a sulky adapted for pulling by a horse includes a rigid frame having a rear cross member and a pair of transversely spaced thills connected to and extending forwardly from this cross member. A frame member mounts a driver's seat on the rigid frame and this frame member is connected to the rear cross member. Two ground engaging wheels are rotatably connected to a rear section of the rigid frame. The seat is mounted to the frame member in a position substantially above the wheels and substantially rearwardly of the rear cross member.

Preferably the aforementioned frame member is an elongate tubular member that extends in the longitudinal direction of the thills and that is pivotally connected to a further cross member located forwardly of the rear cross member and rigidly connected to the two thills.

Further features and advantages will become apparent from the following detailed description of a preferred embodiment taken in conjunction with the accompanying drawings.

BRIEF DESCRIPTION OF THE DRAWINGS

FIG. 1 is a perspective view of a horse drawn sulky constructed in accordance with the invention;

FIG. 2 is a top view of a sulky of FIG. 1 with portions removed for purposes of illustration;

FIG. 3 is a side elevation of the sulky of FIG. 1, which view shows the high position of the seat;

FIG. 4 is a detailed view taken along the line 4—4 of FIG. 2 showing the shock absorbing mechanism for the seat;

FIG. 5 is a further detailed view taken along the line 5—5 of FIG. 2 and illustrating how the top end of a wheel mount is connected to the rigid frame; and, FIG. 6 is a detailed view illustrating how the end of a torsion bar is connected to the wheel mount.

DETAILED DESCRIPTION OF PREFERRED EMBODIMENT

The sulky 10 shown in FIG. 1 is adapted to be pulled by an animal and in particular a horse which is harnessed to a forward portion of its rigid frame 12. The preferred rigid frame includes a rear cross member 14 and a forward cross member 16 and a pair of transversely spaced thills 18. Each thill preferably comprises a forward section 20 and a rear section 22, the latter being an integral extension of the tubular rear cross member 14. In one preferred embodiment the front section 18 is made of one inch diameter aluminum pipe while the rear section 22 is formed from one and quarter inch galvanized metal pipe. The front and rear sections can be detachably connected by a bolt and nut combination 24.

The sulky also includes two inflatable rubber tire wheels 28. The rubber tire is mounted on a spoked rim 30. Each wheel is mounted to rotate freely on an axle located at 32. The ground engaging wheels 28 are rotatably connected to a lower end of a wheel mount 34. There are two of these wheel mounts 34 which are transversely spaced from one another and which extend downwardly and rearwardly from a point where they are connected to the rigid frame 12. The illustrated wheel mount in fact consists of two parallel, spaced apart frame members 36 and 38 and the wheel 28 is arranged between these two frame members. In one embodiment each frame member comprises one inch square metal tubing that is connected at the bottom end to the axle 32. The upper end of each frame member 36, 38 is pivotably connected to a metal U-bracket which can be welded to the frame 12. The U-bracket 40 has two downwardly extending legs 42, one of which is illustrated in FIG. 5. Each leg 42 has a suitable hole to receive a pivot bolt 44 held in place by a suitable nut. In one preferred embodiment the U-bracket 40 has a width of twelve inches and a height of two inches and is made from quarter inch plate. Each bracket 40 is preferably connected to and arranged below the forward cross member 16.

A simple and effective torsion bar suspension means 50 is connected to both of the wheel mounts 34 and the rigid frame 12 for yieldably supporting the frame 12 on the two wheels. As illustrated, the torsion bar suspension mechanism is rigidly connected to the forward cross member 16 by means of an ear or lug 52 welded to the rear side of the forward cross member. It will be appreciated that a suitable hole is formed in this ear 52 to receive a torsion bar which can be welded to the ear. In a preferred embodiment, the torsion bar 54 is bent in a U-shape and has a round half inch diameter cross section. The torsion bar 54 has two parallel legs 56 and a connecting portion 58. An end portion of each leg 56 is connected to a respective one of the wheel mounts 34 while the connecting portion 58 is rigidly connected at its center to a central portion of the cross member 16. As illustrated is detail in FIG. 6 the end portion 60 of each leg is preferably arranged in a channel member 62 rigidly connected to the inner side of the respective wheel mount 34 and extending therealong. In one preferred version of the sulky, the metal channel member 62 forms a passageway 64 having a width and depth of about one half inch. Preferably this channel member is welded to the frame member 36 at a location towards the upper end of the wheel mount 34. It will be appreciated that because of the ability of the torsion bar 54 to twist about its axial center, this suspension mechanism permits a limited degree, of pivotal movement of each wheel about the pivot axis formed by the pivot pins extending through the bracket 40.

A seat 70 is mounted at the very rear of the sulky. The seat is preferably a bucket-type seat having a back support 72. The seat is preferably connected to the rigid frame 12 by means of an elongate frame member 74 extending in the longitudinal direction of the thills and disposed between rear end portions of the thills. The seat 70 can he a type of known construction commonly used on tractors. The bottom of the seat is adjustably connected to the frame member 74 by an adjustable seat bracket 76 having a row of bolt holes 78 arranged therein.

The front end of the frame member 74 is pivotably connected to the forward cross member 16 by means of a metal U-bracket 80. In one preferred embodiment this bracket is two inches wide and three inches deep and made from one quarter inch plate. A half inch pivot bolt 82 extends through this bracket and through a hole formed in the front end of member 74. A shock absorber mechanism 84 preferably connects the frame member 74 to the rear cross member 14. Preferably the shock absorber mechanism connects to an intermediate portion 86 of the frame member 74 as illustrated. The detailed construction of the shock absorber can be seen from FIG. 4. The mechanism includes a coil spring 86 that extends around a cylinder-piston combination 88. The bottom end of the cylinder is pivotably connected to a metal L-bracket 90 which in turn is attached such as by welding to the rear cross member 14. The upper end of the piston is pivotably attached to a metal L-bracket 92 that is attached such as by welding to the frame member 74. It will be seen that with this mechanism 84, the seat 70 is yieldably supported on the sulky frame 12 and thus the ride of the driver is further cushioned and is made more comfortable.

Preferably there is also attached to the rear cross member 14 two metal rod footrests 94 suitably located on opposite sides of the frame member 74. Another preferred feature is the provision of suitable plastic fenders 96 which can be mounted by means of U-brackets 98 attached to the bottom end of the wheel mounts 34.

As can be seen from FIGS. 1 and 3, the elongate frame member 74 extends rearwardly from the rear cross member 14 and then upwardly to the seat 70. The seat 70 is arranged substantially above the wheels and substantially rearwardly of the rear cross member 14. In this position the seat can easily be mounted and the driver when seated has a higher plane of view compared to known sulkies. The preferred frame member 74 is a single tubular member that is bent upwardly in a smooth curve to where the member connects to the seat. In one preferred embodiment, the frame member 74 is made from one and one quarter inch galvanized metal pipe.

Various modifications and changes to the described sulky will he apparent to those skilled in this art from the preceding description. Accordingly all such modifications and changes as fall within the scope of the appended claims are intended to be part of this invention.

I therefore claim:

1. A sulky adapted for pulling by an animal comprising a rigid frame having a rear cross member and a pair of transversely spaced thills extending forwardly from the cross member, a driver's seat, means for mounting said seat on said rigid frame, a pair of transversely spaced, downwardly-extending wheel mounts having upper and lower ends and being pivotably connected at their upper ends to said rigid frame, a ground engaging wheel rotatively connected to the lower end of each of said wheel mounts, and a single torsion bar suspension means connected directly to both of said wheel mounts and said frame for yieldably supporting the frame on the two wheels.

2. A sulky according to claim 1 wherein said frame includes a second cross member spaced forwardly of said rear cross member and rigidly connected to said thills and said torsion bar suspension means is rigidly connected to said second cross member.

3. A sulky according to claim 2 wherein said suspension means includes a U-shaped torsion bar having two parallel legs and a connecting portion, an end portion of each leg is connected to a respective one of said wheel mounts, and said connecting portion is rigidly connected to a central portion of said second cross member.

4. A sulky according to claim 3 wherein each wheel mount comprises two parallel, spaced apart frame members, which slope downwardly and rearwardly, and the wheel connected to each wheel mount is arranged between said two frame members.

5. A sulky according to claim 1 wherein said seat mounting means includes a tubular member which is pivotably and yieldably supported on said frame and which extends rearwardly and then upwardly from said rear cross member.

6. A sulky according to claim 2 wherein said seat mounting means includes a tubular member which is pivotably connected to a center portion of said second cross member and which is yieldably supported by said rear cross member, said tubular member extending rearwardly and then upwardly from said rear cross member.

7. A sulky according to claim 6 wherein said tubular member supports said seat a substantial distance above said wheels and above said rear cross member.

8. A sulky according to claim 7 wherein said tubular member extends over said rear cross member, then downwardly and rearwardly, and then curves upwardly to said seat.

9. A sulky according to claim 3 wherein said end portion of each leg is arranged in a channel member rigidly connected to a side of the respective wheel mount and extending therealong.

10. A sulky according to claim 9 wherein each said channel member is connected to an inner side of the respective wheel mount towards the upper end of the wheel mount.

11. A racing type sulky comprising a rigid frame having a pair of transversely spaced longitudinally extending thills having a front and rear portion and cross frame means having parallel rear and forward cross frame members extending between and connecting said thills together at said rear portion, a driver's seat, a single elongate frame member having a front and rear end and extending in the longitudinal direction of said thills, disposed between rear end portions of said thills, and having said seat mounted on the rear end of said elongate frame member, a front end of said frame member being pivotably connected to said forward cross frame member, a shock absorber mechanism connecting said elongate frame member to said rear cross frame member at a portion of said elongate frame member between said seat and said pivotal connection, two ground engaging wheels, and means for rotatively connecting said wheels to a rear section of said rigid frame.

12. A sulky according to claim 11 wherein said elongate frame member extends rearwardly from said cross frame means and then upwardly to said seat and said seat is arranged substantially above said wheels.

13. A sulky according to claim 11 wherein said wheel mounting means includes a pair of transversely-spaced wheel mounts each pivotably connected at one end to said rigid frame and extending downwardly and rearwardly from the point of connection to said rigid frame and suspension means connected to both of said wheel mounts and said rigid frame for yieldably supporting said frame on the two wheels.

* * * * *